US010886087B2

(12) United States Patent
Pineda et al.

(10) Patent No.: US 10,886,087 B2
(45) Date of Patent: Jan. 5, 2021

(54) OVERCURRENT PROTECTION DEVICE AND METHOD OF FORMING AN OVERCURRENT PROTECTION DEVICE

(71) Applicant: Littelfuse, Inc., Chicago, IL (US)

(72) Inventors: Martin G. Pineda, Fremont, CA (US); Sergio Fuentes, Newark, CA (US); Chun-Kwan Tsang, Morgan Hill, CA (US)

(73) Assignee: Littelfuse, Inc., Chicago, IL (US)

( * ) Notice: Subject to any disclaimer, the term of this patent is extended or adjusted under 35 U.S.C. 154(b) by 549 days.

(21) Appl. No.: 15/801,545

(22) Filed: Nov. 2, 2017

(65) Prior Publication Data

US 2019/0131101 A1 May 2, 2019

(51) Int. Cl.

*H02H 9/00* (2006.01)
*H01H 77/04* (2006.01)
*H01H 71/08* (2006.01)
*H01H 69/00* (2006.01)
*H01H 71/14* (2006.01)

(52) U.S. Cl.

CPC ............ *H01H 77/04* (2013.01); *H01H 69/00* (2013.01); *H01H 71/08* (2013.01); *H01H 71/14* (2013.01); *H01H 2203/01* (2013.01)

(58) Field of Classification Search

CPC ........ H01H 77/04; H01H 71/08; H01H 71/14; H01H 69/00

USPC ........................................................... 361/57

See application file for complete search history.

(56) References Cited

U.S. PATENT DOCUMENTS

| | | | | |
|---|---|---|---|---|
| 5,837,164 A * | 11/1998 | Zhao | H01C 7/027 | 252/500 |
| 6,522,237 B1 * | 2/2003 | Ito | H01C 1/1406 | 338/22 R |
| 2009/0045908 A1 * | 2/2009 | Tanaka | H01C 7/027 | 338/25 |

* cited by examiner

*Primary Examiner* — Jared Fureman
*Assistant Examiner* — Lucy M Thomas
(74) *Attorney, Agent, or Firm* — Kacvinsky Daisak Bluni PLLC

(57) ABSTRACT

An overcurrent protection device according to an embodiment of the present disclosure may include a first electrode disposed substantially parallel to a second electrode. A material may be disposed between the first electrode and the second electrode. A plurality of conductive material nodules may be disposed in the material between the first electrode and the second electrode, including a first conductive material nodule at least partially contacting an inner surface of the first electrode and a second conductive material nodule at least partially contacting an inner surface of the second electrode and the first conductive material nodule. In response to an overcurrent condition the material may be configured to expand, such that the contact between the first electrode, the first conductive material nodule, the second conductive material nodule, and the second electrode is at least partially interrupted.

6 Claims, 5 Drawing Sheets

OVERCURRENT PROTECTION DEVICE AND METHOD OF FORMING AN OVERCURRENT PROTECTION DEVICE

FIELD OF THE DISCLOSURE

Embodiments of the present disclosure relate generally to the field of circuit protection devices, and more particularly to polymeric positive temperature coefficient (PPTC) devices.

BACKGROUND OF THE DISCLOSURE

Polymeric positive temperature coefficient (PPTC) devices are used to provide resettable overcurrent protection in many applications, e.g., consumer electronics and automotive applications. During an overcurrent condition, a PPTC device may rapidly increase in temperature, which in turn causes the resistance of the PPTC device to increase to effectively establish an open circuit and mitigate potentially damaging follow on currents. Subsequently, when the temperature of the PPTC cools to an acceptable level, the PPTC device may "reset" (i.e., the resistance of the PPTC device may drop to a pre-overcurrent level) and may conduct current as in normal operation.

Some PPTC devices may be adapted to support high "hold currents." A "hold current" is a maximum current that a PPTC device may conduct before the temperature and resistance of the PPTC device increase to impede current flow. However, devices that support high hold currents are typically large and are not suitable for applications that require small form factors, and efforts to reduce device size may be costly.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of an overcurrent protection device in accordance with the present disclosure may include a first electrode disposed substantially parallel to a second electrode, a material disposed between the first electrode and the second electrode, and a plurality of conductive material nodules disposed in the material between the first electrode and the second electrode, including a first conductive material nodule at least partially contacting an inner surface of the first electrode and a second conductive material nodule at least partially contacting an inner surface of the second electrode and the first conductive material nodule. In response to an overcurrent condition the material may be configured to expand, such that the contact between the first electrode, the first conductive material nodule, the second conductive material nodule, and the second electrode is at least partially interrupted.

According to another exemplary embodiment of the present disclosure, an overcurrent protection device may include a first electrode disposed substantially parallel to a second electrode, a mesh disposed between the first electrode and the second electrode, the mesh contacting an inner surface of the first electrode and an inner surface of the second electrode, and a material disposed on the mesh and between the first electrode and the second electrode. In response to an overcurrent condition the material may be configured to expand, such that the contact between the mesh, the first electrode, and the second electrode is at least partially interrupted.

According to another exemplary embodiment of present disclosure, a method of forming an overcurrent protection device may include forming a mesh between a first electrode and a second electrode, the mesh contacting an inner surface of the first electrode and an inner surface of the second electrode, and applying a material on the mesh between the first electrode and the second electrode. In response to an overcurrent condition, material may be expanded such that the contact between the mesh, the first electrode, and the second electrode is at least partially interrupted.

BRIEF DESCRIPTION OF THE DRAWINGS

By way of example, specific embodiments of the disclosed device will now be described, with reference to the accompanying drawings, in which.

DETAILED DESCRIPTION

Figure 1B:
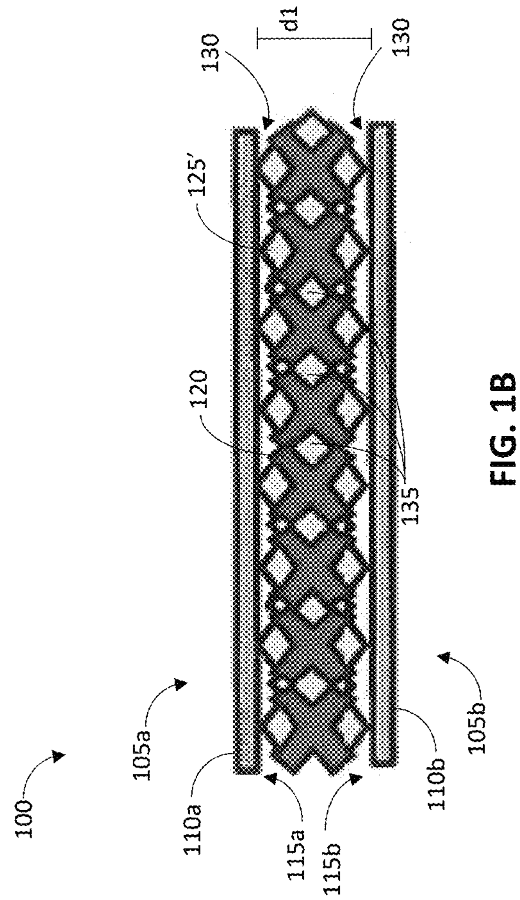
FIG. 1B is a side view illustrating the overcurrent protection device of FIG. 1A in an overcurrent condition in accordance with the present disclosure.

An overcurrent protection device, or PPTC device, in accordance with the present disclosure will now be described more fully hereinafter with reference to the accompanying drawings, in which certain exemplary embodiments of the overcurrent protection device are presented. The overcurrent protection device may be embodied in many different forms and is not to be construed as being limited to the embodiments set forth herein. These embodiments are provided so that this disclosure will be thorough and complete, and will convey certain exemplary aspects of the overcurrent protection device to those skilled in the art. In the drawings, like numbers refer to like elements throughout unless otherwise noted.

Figure 1A:
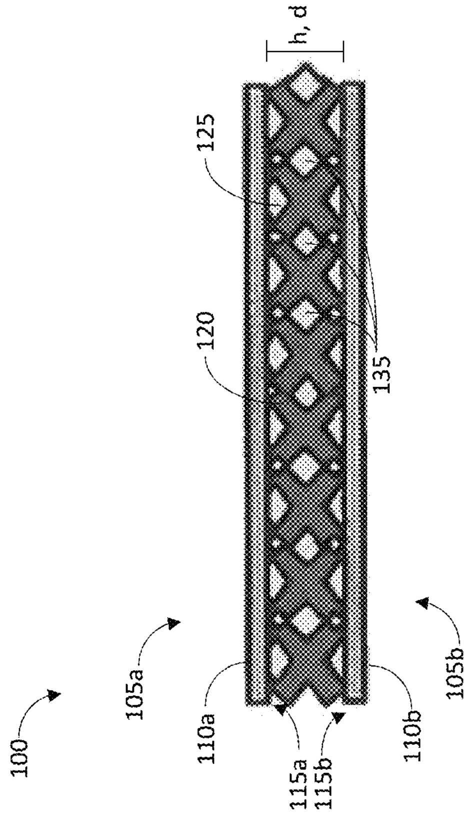
FIG. 1A is a side view illustrating an exemplary embodiment of an overcurrent protection device in a normal operating condition in accordance with the present disclosure.
Figure 2:
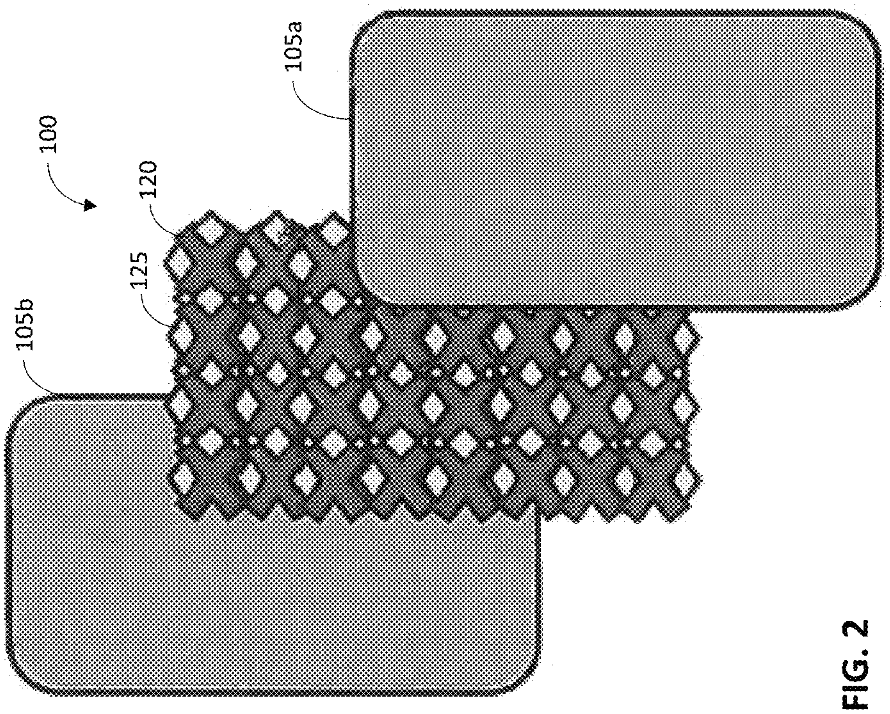
FIG. 2 is an exploded view illustrating the overcurrent protection device shown in FIGS. 1A and 1B.

FIGS. 1A, 1B, and 2 illustrate an overcurrent protection device 100 in accordance with an exemplary embodiment of the present disclosure, with FIG. 1A showing the overcurrent protection device 100 in a normal condition, FIG. 1B showing the overcurrent protection device 100 in an overcurrent condition, and FIG. 2 showing the overcurrent protection device 100 in an exploded view. The device 100 may include a first electrode 105*a* and a second electrode

105*b*, each having a respective outer surface 110*a*, 110*b*, and inner surface 115*a*, 115*b*. The first electrode 105*a* and the second electrode 105*b* may be disposed parallel to each other and a distance d apart. A mesh 120 may be disposed between the inner surface 115*a* of the first electrode 105*a* and the inner surface 115*b* of the second electrode 105*b*. As will be discussed below, the mesh 120 includes a plurality of interconnected strands that form a continuous linkage around interstices 135 (FIGS. 4A-4D). A polymer material 125 may be disposed around the mesh 120 and adjacent the first and second electrodes 105*a*, 105*b*, so that the polymer material 125 fills the interstices 135 of the mesh 120. In embodiments, the polymer material 125 may be semi-crystalline polymers. In certain embodiments, the mesh 120 may be covered in the polymer material 125 by one of an extrusion process, a doctor blade process, and a die casting process.

In a normal condition, as illustrated in FIG. 1A, the mesh 120 may have a height h so that the mesh 120 contacts the inner surface 115*a* of the first electrode 105*a* and the inner surface 115*b* of the second electrode 105*b*, so that a current may flow through the device via terminals (not shown) attached to the first electrode 105*a* and the second electrode 105*b* during normal operation. The height h may be substantially equal to the distance d between the first electrode 105*a* and the second electrode 105*b*. Current may flow through the device 100 from the first electrode 105*a* to the second electrode 105*b* or vice versa.

In the event of an overcurrent condition, as shown in FIG. 1B, a temperature of the device 100 may rapidly increase, thereby generating a substantial amount of heat. The heated polymer material 125' may expand to create gaps 130 between the mesh 120 and the first electrode 105*a*, and between the mesh 120 and the second electrode 105*b* so that the mesh 120 does not contact the first electrode 105*a* and the second electrode 105*b*. The distance dl between the first electrode 105*a* and the second electrode 105*b* may therefore be greater than the distance d when the device is operating under normal conditions. For example, dl may be greater than the height h of the mesh 120. The mesh 120 may stretch laterally as a temperature increases to create a break with the first electrode 105*a* and/or the second electrode 105*b*. The gaps 130 in the device 100 may break the current path so that the device 100 is in an electrically non-conductive, open condition so long as the polymer material 125' is in the expanded, or heated, condition. While the gaps 130 are present between the mesh 120 and the first and second electrodes 105*a*, 105*b*, there is no path for electrical current, thus protecting sensitive electrical components that the device 100 may be connected to from an overcurrent condition. In some embodiments, the temperature of the device 100 may reach approximately 100° C., upon which the resistance may rapidly increase. As the resistance generates substantial heat, the polymer material 125 may expand to separate the mesh 120 from the electrodes 105*a*, 105*b* by gaps 130.

In some embodiments, the device 100 may be resettable, in that when the temperature of the device 100 decreases to an acceptable level, the polymer material 125 contracts to its normal state, thereby allowing conductivity through the device 100. When the polymer material 125 is in its contracted state the mesh 120 and the electrodes 105*a*, 105*b* may once again contact each other to allow for current flow through the device 100. In some embodiments, although the temperature may decrease to an acceptable level for the device 100 to reset, the fault condition may not be removed. For example, the device 100 may not latch in a tripped state, similar to a bimetal device.

In certain embodiments, the first and second electrodes 105*a*, 105*b* made be formed of a conductive metal material, e.g., copper, nickel, or an alloy thereof. In some embodiments, the electrodes 105*a*, 105*b* may be a foil. The mesh 120 may also be formed of a conductive material, e.g., copper, steel, stainless steel, brass, aluminum, niobium, or an alloy thereof. The polymer material 125 may be an organic thermoplastic material, having a melting point between approximately 60° C. and approximately 220° C., and may be cross-linked by radiation or a chemical process. The polymer material 125 may be any thermoplastic material which expands when heat is applied to surrounding components, including but not limited to polyvinylidene fluoride (PVDF), polyvinylidene difluoride, polyethylene, ethylene tetrafluoroethylene, ethylene vinyl acetate, ethylene butyl acrylate and other materials having similar characteristics.

Figure 3C:
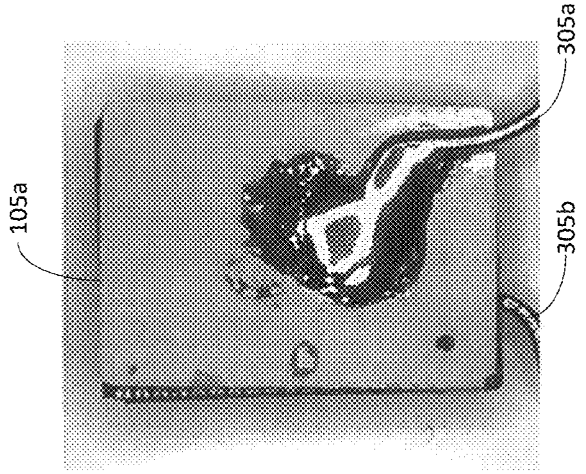
FIGS. 3A-3C are a plurality of top views illustrating an assembly of the overcurrent protection device shown in FIGS. 1A and 1B.
Figure 3B:
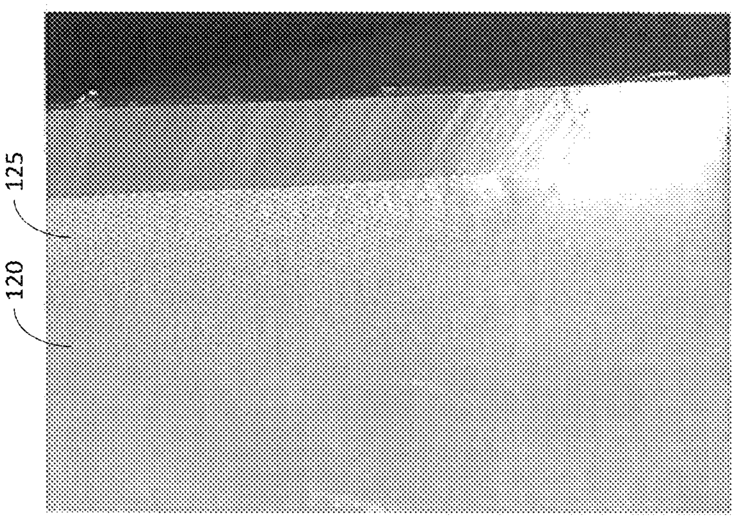
Figure 3A:
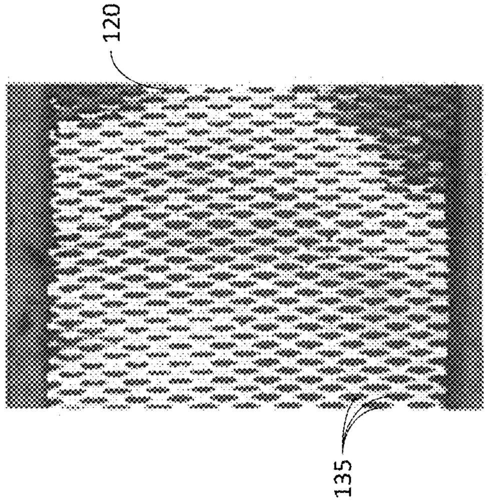

Referring now to FIGS. 3A-3C, an assembly of the device 100 is shown. FIG. 3A illustrates a mesh 120 formed of interconnected strands that define a plurality of interstices 135. FIG. 3B illustrates a polymer material 125 applied to the mesh 120, so that the polymer material 125 impregnates the mesh 120 to fill the interstices 135. In certain embodiments, the polymer material 125 may be applied to the mesh 120 via extrusion, a doctor blade process, or a die casting process. FIG. 3C illustrates that the mesh 120 and the polymer material 125 are laminated between a first electrode 105*a* and a second electrode 105*b* (not shown) to form the device 100. The first and second electrodes 105*a*, 105*b* may be attached so that the mesh 120 contacts an inner surface 115*a* of the first electrode 105*a* and an inner surface 115*b* of the second electrode 105*b*. The contact between the upper first electrode 105*a*, the mesh 120, and the second electrode 105*b* may allow for a current to flow through the device via terminals 305*a*, 305*b* in operation.

Figure 4A:
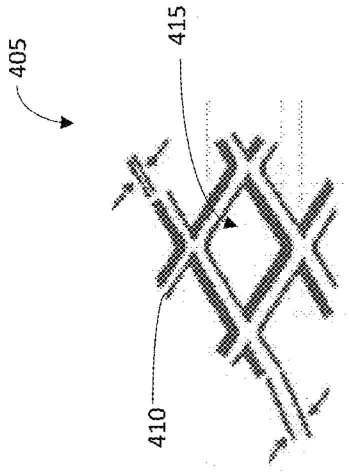
FIGS. 4A-4D are a plurality of top views illustrating exemplary embodiments of a mesh of the overcurrent protection device shown in FIGS. 1A and 1B.
Figure 4D:
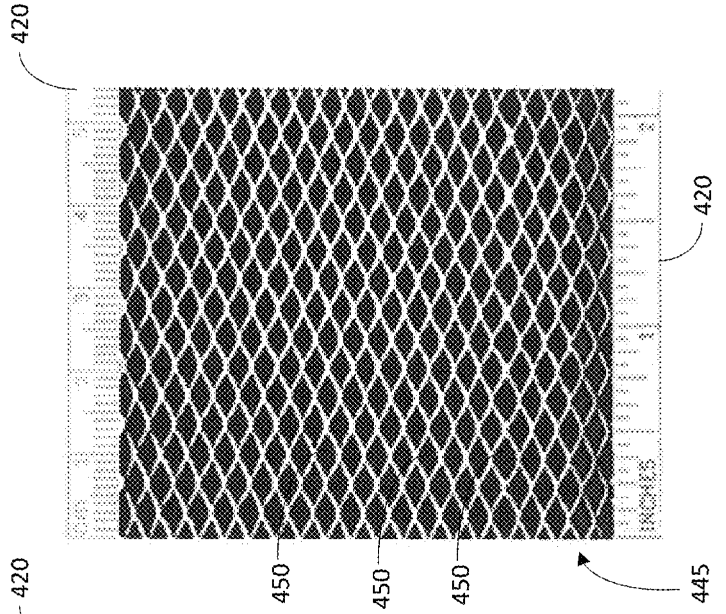
Figure 4C:
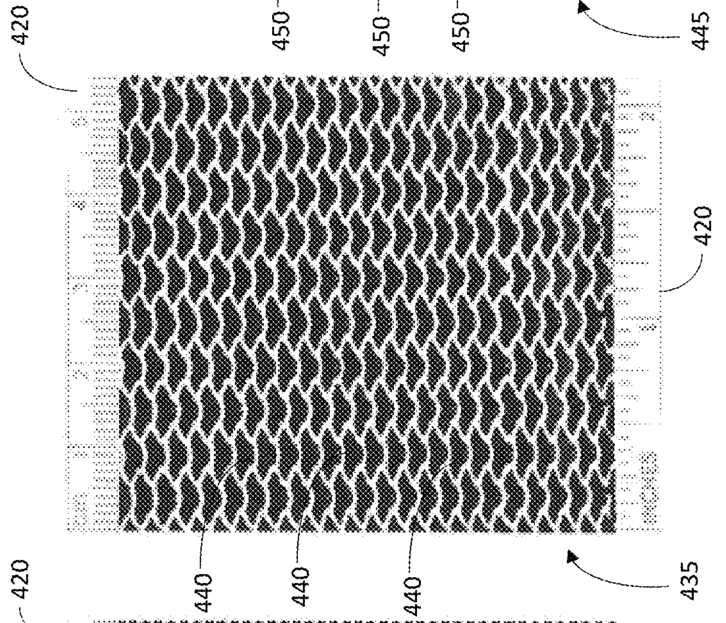
Figure 4B:
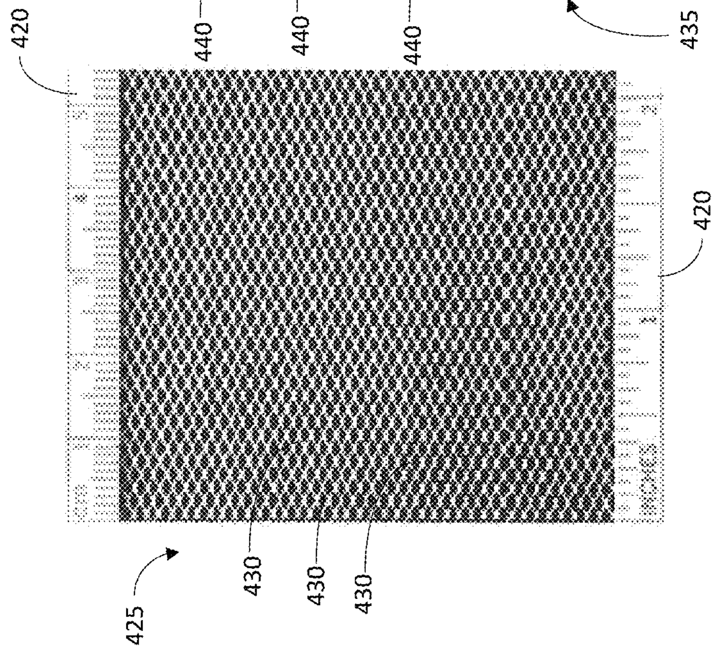

As described above, the mesh 120 may be formed by interconnected strands that define a plurality of interstices. FIGS. 4A-4D illustrate various exemplary embodiments of a mesh 410, 425, 435, 445 in accordance with the present disclosure. The mesh may have interstices of different sizes and shapes depending on the material to obtain a desired control of the current flow. Referring to FIG. 4A, a portion 405 of a copper or copper alloy mesh 410 is shown. The mesh 410 may be formed of interconnecting strands to create diamond shaped interstices 415. FIGS. 4B-4D illustrate mesh sizes and shapes relative to the provided scale 420. FIG. 4B shows a finer mesh 425, in that the interconnecting strands may create a plurality of interstices 430 of a relatively smaller size than the meshes 435, 445 illustrated in FIGS. 4C and 4D. In some embodiments, the mesh 425 may be formed of a brass material. FIG. 4C shows a mesh 435 having a plurality of interstices 440, and FIG. 4D shows a mesh 445 having a plurality of interstices 450, of which the interstices 440 and 450 may be relatively larger than interstices 430 shown in FIG. 4B. The mesh 435 may have interconnected strands forming winged shaped interstices 440, which may be formed of an aluminum or aluminum alloy. The mesh 445 may have interconnected strands forming diamond shaped interstices 450. Although the various shapes and sizes of the mesh are described with respect to FIGS. 4A-4D, it will be understood that the mesh may be formed into any known size and shape configuration, including, but not limited to, diamond, winged, circular, curvatures, and curvilinear, to allow for a desired current conduction through the device 100 and impregnation by the polymer material 125.

Figure 5B:
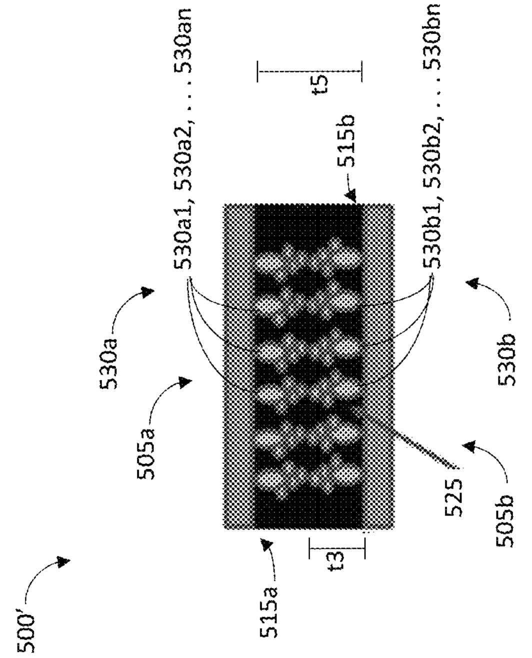
FIG. 5B is a side view illustrating another exemplary embodiment of an overcurrent protection device without a mesh in a normal operating condition in accordance with the present disclosure.
Figure 5A:
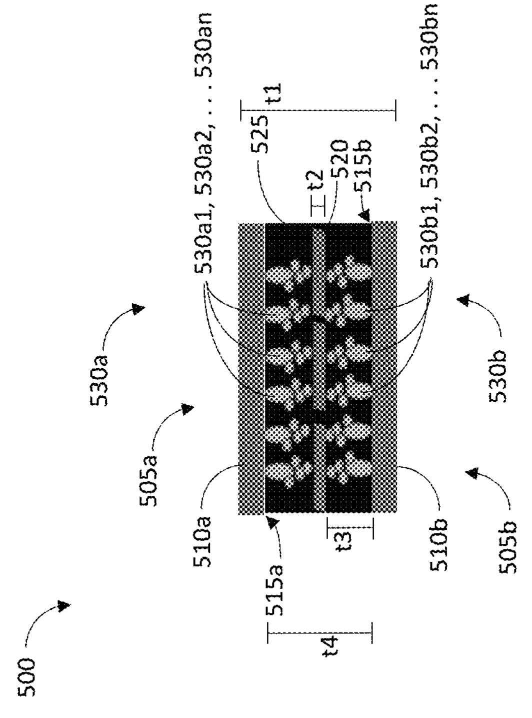
FIG. 5A is a side view illustrating another exemplary embodiment of an overcurrent protection device in a normal operating condition in accordance with the present disclosure.

Referring now to FIGS. 5A and 5B, exemplary embodiments of an overcurrent protection device 500, 500' in accordance with the present disclosure are shown. The device 500 may include a first electrode 505*a* and a second electrode 505*b* having respective outer surfaces 510*a*, 510*b* and respective inner surfaces 515*a*, 515*b*. As shown in FIG. 5A, a mesh 520 may be disposed in between the first and second electrodes 505*a*, 505*b* and may include a plurality of conductive material nodules 530*a*, 530*b* disposed between the mesh 520 and the inner surface 515*a* of the first electrode 505*a*, and the mesh 520 and the inner surface 515*b* of the second electrode 505*b*. A material 525 may be impregnated with the plurality of conductive material nodules 530*a*, 530*b* and disposed on the mesh 520 between the first and second electrodes 505*a*, 505*b*. For example, a first conductive material nodule 530*a*1 may at least partially contact the inner surface 515*a* of the first electrode 505*a* and the mesh 520, and a second conductive material nodule 530*b*1 may at least partially contact the inner surface 515*b* of the second electrode 505*b* and the mesh 520. A plurality of first conductive material nodules 530*a*1, 530*a*2, . . . 530*an*, and a plurality of second conductive material nodules 530*b*1, *b*2, . . . *bn*, may be included in the material 525, and reference to individual first and second material nodules 530*a*1 and 530*b*1 throughout may be understood to include additional first and second material nodules 530*a*1, 530*a*2, . . . 530*an*, and 530*b*1, 530*b*2, . . . 530*bn*.

FIG. 5B illustrates a device 500' that does not include a mesh 520, so that the plurality of conductive material nodules 530*a*, 530*b* impregnated in the material 525 may at least partially contact each other and respective inner surfaces 515*a*, 515*b* of the first and second electrodes 505*a*, 505*b* to form conductive contact. For example, a first conductive material nodule 530*a*1 may at least partially contact the inner surface 515*a* of the first electrode 505*a* and a second conductive material nodule 530*b*1, and the second conductive material nodule 530*b*1 may at least partially contact the inner surface 515*b* of the second electrode 505*b* and the first conductive material nodule 530*a*1.

For devices 500, 500', the material 525 may be a thermoplastic material, e.g., including but not limited to polyvinylidene fluoride (PVDF), polyvinylidene difluoride, polyethylene, ethylene tetrafluoroethylene, ethylene vinyl acetate, ethylene butyl acrylate, and other materials having similar characteristics. The plurality of conductive material nodules 530*a*, 530*b* may be formed of a conductive metal material, and may have a concentration of up to approximately 10%, or up to approximately 50%. In some embodiments, the plurality of conductive material nodules 530*a*, 530*b* may be formed of a copper, nickel, or alloy thereof.

It may be advantageous to impregnate the material 525 with the plurality of conductive material nodules 530*a*, 530*b*, so that the device 500 maintains an open state in the event of an overcurrent condition. As described above, a device may continually open and close as the polymer expands and contracts depending on the heat generated by the resistance, e.g., the device may not latch in its tripped state. As described above, this may allow devices to continually trip and reset based only on the temperature of the device like in a bimetal device. By including the plurality of conductive material nodules 530*a*, 530*b*, in the material 525, the heat generated in an overcurrent condition may maintain the open state by the expanded material 525 until the fault is removed from the device 500 and is sufficiently cooled to reset. For example, when the device 500, 500' trips and is in a state of high resistance, the plurality of conductive material nodules 530*a*, 530*b*, may still conduct a low level of electrical current. Although some current may be able to flow via the plurality of conductive material nodules 530*a*, 530*b*, the flow of current may be substantially reduced to prevent damage to sensitive electrical components connected to the device 500, 500'. In some embodiments, temperatures may range from approximately 60° C. to 350° C., and the hold current may reach up to approximately 10 amps. With a low level of current being able to flow through the conductive material nodules 530*a*, 530*b*, the device 500, 500' may remain heated to maintain an open condition until the fault is removed. So that the device 500, 500' remains latched until the fault is removed may be advantageous for protecting sensitive electrical devices connected to the device 500, 500'.

When the device 500, 500' operates normally, current may flow from the first electrode 505*a*, through the mesh 520 (if present) and a plurality of conductive material nodules 530*a*, 530*b*, and to the second electrode 505*b*, or vice versa, between terminals (not shown). In some embodiments, the mesh 520 contacting the first and second electrodes 505*a*, 505*b* may allow for current to flow through the device 500. In an overcurrent event, the resistance of the device 500, 500' may rapidly increase, generating heat in the device 500. As the device 500 increases in temperature, the material 525 may expand, thereby at least partially interrupting the connection between the first electrode 505*a*, mesh 520 (if present), and second electrode 505*b*. As described above, the conductive material nodules 530*a*, 530*b* may allow a low level of current. The presence of the conductive material nodules 530*a*, 530*b* in the material 525 may result in the material 525 remaining heated for a period of time after the overcurrent condition occurs. With the conductive material nodules 530*a*, 530*b* remaining heated, an expanded configuration of the material 525 may maintain the device 500 in an open configuration until the fault is removed and the device 500, 500' is sufficiently cooled to "reset" (i.e., reestablish electrical conduction).

As shown in FIG. 5A, the build thickness of the device 500 may allow for appropriate expansion and separation to at least partially interrupt current flow. For example, the device 500 may be approximately 115 μm thick at t1, the mesh 520 may be approximately 32 μm at t2, the conductive material nodules 530*a*, 530*b* may be approximately 12 μm long at t3. In other embodiments, the thickness of the material 525 including the conductive material nodules 530*a*, 530*b* and the mesh 520 at t4 may be approximately 50 μm. As described above, the device 500, 500' may be configured to latch when tripped, so that a fault condition must be removed before the device 500, 500' will reset.

The configuration illustrated in FIG. 5B may be advantageous when a thinner layer of material 525 is desirable. In some embodiments, the conductive material nodules may at least partially contact each other at an end of the nodule 530*a*, 530*b*, so that approximately twice the length of the conductive material nodule 530*a*, 530*b* is equal to the thickness of the material, or $2 \times t3 \cong t5$. For example, the thickness t5 may be less than t4 shown in FIG. 5A. In some embodiments, the thickness may be approximately 24 μm, so that conductive material nodules 530*a*, 530*ba* having a length of approximately 12 μm may extend the thickness t5 to the respective inner surfaces 515*a*, 515*b* of the first and second electrodes 505*a*, 505*b*.

As used herein, references to "an embodiment," "an implementation," "an example," and/or equivalents is not intended to be interpreted as excluding the existence of additional embodiments also incorporating the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize its usefulness is not limited thereto and the present disclosure can be beneficially implemented in any number of environments for any number of purposes. Thus, the claims set forth below are to be construed in view of the full breadth and spirit of the present disclosure as described herein.

What is claimed is:

1. An overcurrent protection device, comprising:

a first electrode disposed substantially parallel to a second electrode;

a material disposed between the first electrode and the second electrode; and a plurality of conductive material nodules disposed in the material between the first electrode and the second electrode, including a first conductive material nodule at least partially contacting an inner surface of the first electrode and a second conductive material nodule at least partially contacting an inner surface of the second electrode and the first conductive material nodule, wherein a thickness of the material between the first electrode and the second electrode is less than or equal to a sum of a length of the first conductive material nodule and a length of the second conductive material nodule;

wherein in response to an overcurrent condition the material is configured to expand, such that the contact between the first electrode, the first conductive material nodule, the second conductive material nodule, and the second electrode is at least partially interrupted.

2. The overcurrent protection device according to claim 1, wherein the material is expandable and contractable relative to a temperature of the overcurrent protection device, such that the overcurrent protection device is configured to trip and latch in response to the overcurrent condition.

3. The overcurrent protection device according to claim 1, wherein the material is semi-crystalline polymers.

4. The overcurrent protection device according to claim 1, wherein the material is at least one of a polyvinylidene fluoride (PVDF), polyvinylidene difluoride, polyethylene, ethylene tetrafluoroethylene, ethylene vinyl acetate, or ethylene butyl acrylate, or combinations thereof.

5. The overcurrent protection device according to claim 1, wherein the plurality of conductive material nodules is disposed in the material at a concentration up to 50%.

6. The overcurrent protection device according to claim 1, wherein the plurality of conductive material nodules is formed of a copper, nickel, or alloy thereof.

* * * * *